(12) United States Patent
Scott

(10) Patent No.: US 11,898,694 B2
(45) Date of Patent: Feb. 13, 2024

(54) FACILITATING MOUNTING TO A SUPPORT HAVING AN UNEVEN GENERALLY VERTICAL SURFACE

(71) Applicant: Cooper Todd Scott, Coquitlam (CA)

(72) Inventor: Cooper Todd Scott, Coquitlam (CA)

( * ) Notice: Subject to any disclaimer, the term of this patent is extended or adjusted under 35 U.S.C. 154(b) by 0 days.

(21) Appl. No.: 17/674,059

(22) Filed: Feb. 17, 2022

(65) Prior Publication Data

US 2022/0260203 A1    Aug. 18, 2022

Related U.S. Application Data

(60) Provisional application No. 63/150,967, filed on Feb. 18, 2021.

(51) Int. Cl.
  *F16M 13/02* (2006.01)
  *A47B 5/02* (2006.01)

(52) U.S. Cl.
  CPC ............. *F16M 13/022* (2013.01); *A47B 5/02* (2013.01)

(58) Field of Classification Search
  CPC ......... F16M 13/02; F16M 13/022; A47B 5/02
  See application file for complete search history.

(56) References Cited

U.S. PATENT DOCUMENTS

| | | | | |
|---|---|---|---|---|
| 3,345,028 A | * | 10/1967 | Lawrie | F21V 37/00 248/230.8 |
| 3,746,294 A | * | 7/1973 | Johnston | F16M 13/022 248/230.8 |
| 4,325,529 A | * | 4/1982 | Seebinger | F16M 13/022 248/219.4 |
| 4,744,537 A | | 5/1988 | Buckley | |
| 5,497,214 A | * | 3/1996 | Labree | F16M 11/08 396/428 |
| 5,601,263 A | * | 2/1997 | Thayer | B05B 15/62 248/219.4 |
| 5,685,103 A | * | 11/1997 | Wiggins | F41A 23/18 248/230.8 |
| 5,769,372 A | * | 6/1998 | Klosterman | F16M 13/022 248/219.4 |
| 6,065,722 A | * | 5/2000 | LeVasseur | F21V 21/08 248/230.8 |
| 6,196,511 B1 | | 3/2001 | Beauchemin | |
| 6,202,964 B1 | | 3/2001 | Thornhill | |
| 7,093,812 B1 | | 8/2006 | Nordeen | |
| 8,087,195 B2 | | 1/2012 | Minges | |
| 8,302,922 B1 | | 11/2012 | Robinson | |

(Continued)

*Primary Examiner* — Monica E Millner
(74) *Attorney, Agent, or Firm* — Kolitch Romano Dascenzo Gates LLC

(57) ABSTRACT

An apparatus for facilitating mounting of an article to a support having an uneven generally vertical surface is disclosed. The apparatus includes a holder including first, second, and third spaced apart surface engagers configured to abut the uneven generally vertical surface of the support, and an article mount coupled to the first, second, and third spaced apart surface engagers, the article mount configured to hold the article. The apparatus includes at least one flexible tension member configured to couple the holder to the support to draw at least one of the first, second, and third surface engagers into abutment with the uneven generally vertical surface of the support. Other apparatuses and systems are disclosed.

19 Claims, 10 Drawing Sheets

(56) References Cited

U.S. PATENT DOCUMENTS

| | | | |
|---|---|---|---|
| 8,607,497 B2* | 12/2013 | Green | A01K 87/00 248/230.8 |
| 9,335,112 B1* | 5/2016 | Sholley | F41C 33/001 |
| 10,799,055 B2 | 10/2020 | McNabb et al. | |
| 10,883,655 B1* | 1/2021 | Rowton | F16M 11/105 |
| 11,221,102 B2* | 1/2022 | Palanisamy | F16B 2/08 |
| 11,497,578 B2* | 11/2022 | Lijoi | A61B 90/53 |
| 2006/0201060 A1 | 9/2006 | Warman et al. | |
| 2006/0231707 A1* | 10/2006 | Schrot | A01M 31/02 248/218.4 |
| 2007/0000163 A1* | 1/2007 | Buckner | F41A 23/18 42/94 |
| 2008/0099655 A1* | 5/2008 | Goodman | G08B 13/19632 248/674 |
| 2010/0018102 A1* | 1/2010 | Minges | A47B 96/027 248/218.4 |
| 2013/0001385 A1* | 1/2013 | Green | A01K 87/00 248/218.4 |
| 2015/0233522 A1* | 8/2015 | Kallas | F16M 11/2021 403/322.2 |
| 2017/0160624 A1* | 6/2017 | Boushell | G03B 17/561 |

* cited by examiner

US 11,898,694 B2

FACILITATING MOUNTING TO A SUPPORT HAVING AN UNEVEN GENERALLY VERTICAL SURFACE

CROSS REFERENCES

This application claims the benefit of U.S. Provisional Application No. 63/150,967 entitled "FACILITATING MOUNTING TO A SUPPORT HAVING AN UNEVEN GENERALLY VERTICAL SURFACE", filed on Feb. 18, 2021, which is hereby incorporated by reference herein in its entirety.

BACKGROUND

1. Field

Embodiments of this disclosure relate to facilitating mounting of an article to a support and more particularly to facilitating mounting of an article to a support having an uneven generally vertical surface.

2. Description of Related Art

Some known devices for mounting an article or attachment to a support having an uneven generally vertical surface, such as, for example, a tree, may have various drawbacks. For example, some known devices may be limited to the use of only one or two specific functions, they may be unstable, unable to connect to and disconnect from the article quickly and/or securely, heavy/bulky, costly, and/or difficult to affix to the support.

SUMMARY

In accordance with various embodiments, there is provided an apparatus for facilitating mounting of an article to a support having an uneven generally vertical surface, the apparatus including a holder including first, second, and third spaced apart surface engagers configured to abut the uneven generally vertical surface of the support, and an article mount coupled to the first, second, and third spaced apart surface engagers, the article mount configured to hold the article. The apparatus includes at least one flexible tension member configured to couple the holder to the support to draw at least one of the first, second, and third surface engagers into abutment with the uneven generally vertical surface of the support.

At least one of the first, second, and third surface engagers may include a point configured to pierce the uneven generally vertical surface of the support.

The article mount may include a base coupling configured to couple to an article coupling of the article.

The base coupling may include a female coupling having an opening for receiving a male coupling of the article.

The female coupling may include a female quick release coupling including locking ball bearings encircling the opening of the female coupling and configured to selectively lock the male coupling of the article within the opening.

The holder may include first and second spaced apart tension member couplers configured to releasably couple to the at least one flexible tension member.

The first tension member coupler may be adjacent to the first surface engager and the second tension member coupler may be adjacent to the second surface engager.

The first and second tension member couplers may be oriented at an angle to one another, the angle being less than 180 degrees.

The angle may be between about 100 degrees and about 140 degrees.

Each of the first and second tension member couplers may include a barb.

The at least one flexible tension member may include a first plurality of spaced apart retainer openings at a first end of the at least one flexible tension member and a second plurality of spaced apart retainer openings at a second end of the at least one flexible tension member, the second end opposite of the first end, wherein the first and second pluralities of retainer openings are configured to couple to the first and second spaced apart tension member couplers respectively.

The at least one flexible tension member may be configured to form at least a portion of a loop for encircling the support when the at least one flexible tension member is coupled to the holder.

Each of the first and second surface engagers may include a respective fastener receiver configured to receive and hold a fastener for fastening to the support.

The article mount may include a generally planar mounting surface configured to abut the article when the article is held and the first, second, and third spaced apart surface engagers may each include a respective leg extending at an angle to the mounting surface, the angle being greater than 90 degrees.

The angle may be about 135 degrees.

In accordance with various embodiments, there is provided a system for mounting to a support having an uneven generally vertical surface, the system including an apparatus as described above, and an article configured to be held by the article mount of the apparatus.

The article may be held by the article mount of the apparatus.

The article may include a garbage holder ring, a tether ball, a portable shelf, a retractable cord, a flood light, or one or more shooting targets.

Other aspects and features of embodiments of the present disclosure will become apparent to those ordinarily skilled in the art upon review of the following description of specific embodiments of the present disclosure in conjunction with the accompanying figures.

BRIEF DESCRIPTION OF THE DRAWINGS

In drawings which illustrate embodiments of the present disclosure.

DETAILED DESCRIPTION

Figure 1:
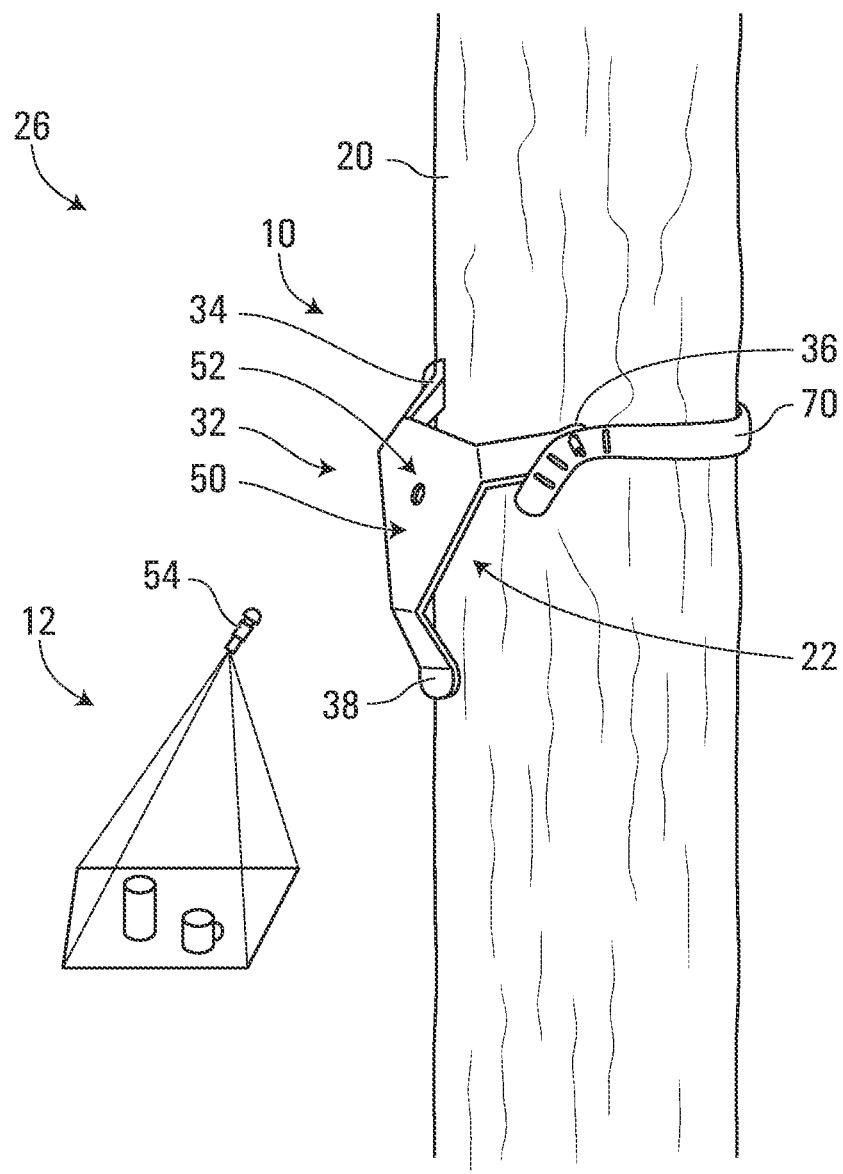
FIG. 1 is a perspective view of a system and an apparatus for facilitating mounting of an article to a support having an uneven generally vertical surface according to various embodiments of the present disclosure.

Referring to FIG. 1, there is provided a perspective view of an apparatus 10 for facilitating mounting of an article 12 to a support 20 having an uneven generally vertical surface 22, in accordance with various embodiments. Article 12 may include any suitable object, structure, or device which the user wishes to mount to the support 20 using apparatus 10. Referring to FIG. 1, the apparatus 10 includes a base or holder 32 having first, second, and third spaced apart surface engagers 34, 36, and 38 configured to abut the uneven generally vertical surface 22 of the support 20. In some embodiments, the support 20 may be a vertical generally cylindrical support, such as, for example, a tree or a post. In some examples, support 20 includes any structure having an uneven surface on which it is desired to mount article 12. In various embodiments, the apparatus 10 may be multifunctional and may be used with a multitude of different functions.

In some embodiments, a system 26 for mounting to the support 20 may include the apparatus 10 and the article 12. In various embodiments, the system 26 and/or the apparatus 10 may facilitate stable and easy mounting of the article 12 to the support 20.

Referring still to FIG. 1, the holder 32 includes an article mount 50 coupled to the first, second, and third spaced apart surface engagers 34, 36, and 38, the article mount 50 configured to hold the article 12. Surface engagers 34, 36, and 38 may include any suitable legs or arm-like structures extending out from article mount 50 and configured to interface with support 20. Article mount 50 may include any suitable structure on which the article 12 may be supported, either directly or indirectly (e.g., by hanging). In some examples, article mount 50 includes a central expanse to which the surface engagers 34, 36, and 38 are coupled, such that the surface engagers extend away from the central expanse. In some examples, article mount 50 is of a unitary construction with the surface engagers. In some examples, the surface engagers form respective angles with respect to a general plane of the article mount, such that they are non-coplanar with the article mount.

For example, in some embodiments, the article mount 50 may include a base coupling 52 configured to couple to an article coupling 54 of the article 12. In some embodiments, for example, the base coupling 52 and the article coupling 54 may together form a removable connector system configured to removably couple the article 12 to the holder 32. Base coupling 52 may comprise a hole or aperture, for example a circular aperture or tube, passing through the article mount 50. In some examples, base coupling 52 is a through-hole, extending from one side to the other. In some examples, base coupling 52 comprises a blind hole having a depth. In some examples, the base coupling 52 may include further structure such as one or more spring-loaded balls. The article coupling 54 may include any suitable structure configured to mate with the base coupling 52, such as a shaped pin having a head configured to be removably accepted by the aperture of the base coupling 52. If spring-loaded ball(s) are present, article coupling 54 may include a recess or groove configured to interface with the ball(s). In some examples, base coupling 52 comprises a pin and article coupling has a corresponding aperture or tubular receptacle. See below for further description.

Figure 2:
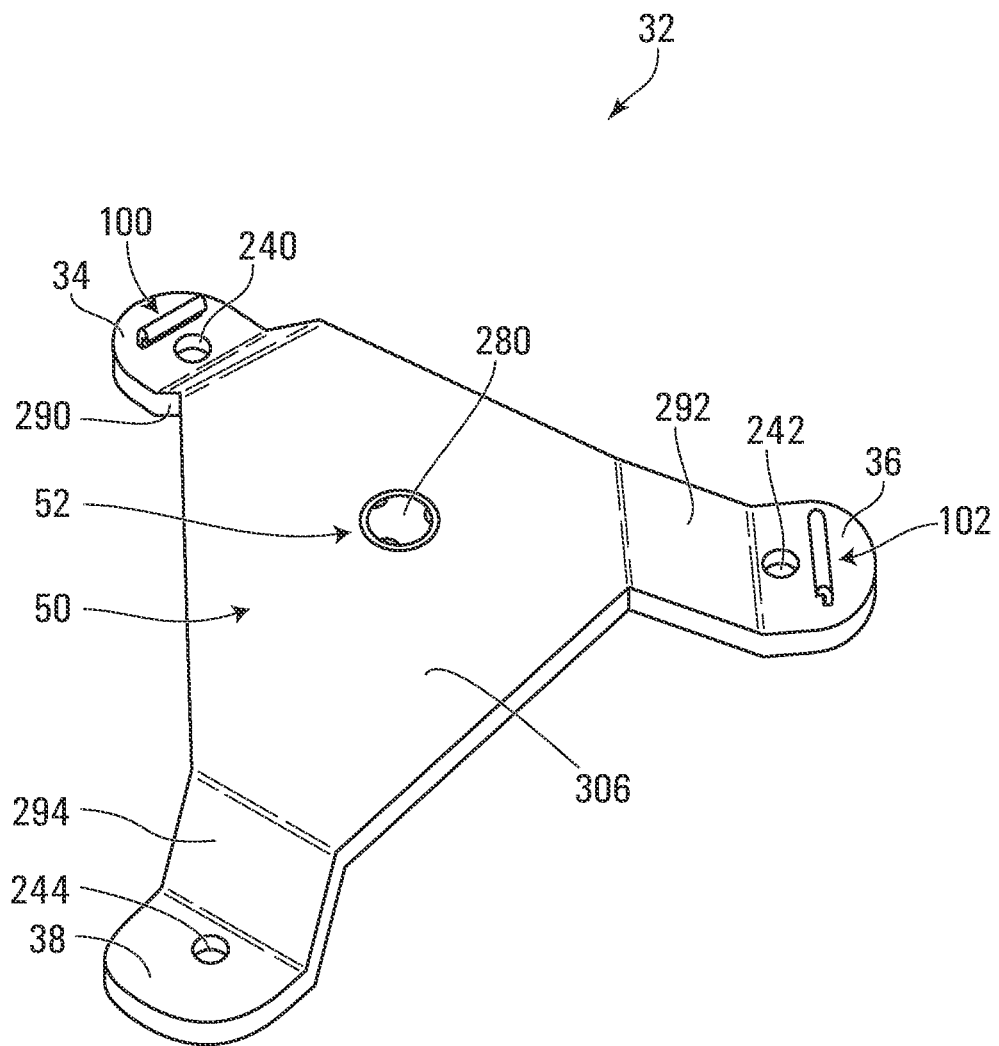
FIG. 2 is a perspective view of a holder of the apparatus shown in FIG. 1 according to various embodiments of the present disclosure.

In some embodiments, the holder 32 may include a single piece of material shaped to form at least a portion of the article mount 50 and at least a portion of the surface engagers 34, 36, and 38. For example, in some embodiments a lightweight metal such as a hardened metal, such as, stainless steel, or an alloy, such as, aluminum alloy, may be used to form at least a portion of the article mount 50 and the surface engagers 34, 36, and 38. In some embodiments, the holder 32 may include a single piece of material that is bent or cast into the shape including the article mount 50 and the surface engagers 34, 36, and 38 as shown in FIG. 2.

Referring to FIG. 1, the apparatus 10 includes a strap 70, acting as a flexible tension member, configured to couple the holder 32 to the support 20 to draw at least one of the first, second, and third surface engagers 34, 36, and 38 into abutment with the uneven generally vertical surface 22 of the support 20. Referring to FIG. 1, in some embodiments, the strap 70 may be made of a flexible and strong material. In some embodiments, the strap 70 may be made of a resiliently stretchable material, such as for example, rubber. In various embodiments, use of a resiliently stretchable material, such as, rubber, may facilitate quick attachment to the support 20, may facilitate adjustment of length via holes, for example, and/or may facilitate quiet use.

In some embodiments, the strap 70 may include a thick rubber strap, such as, for example about a 0.25" thick rubber strap. In some embodiments, the strap may include a strong flexible webbing, which may, for example, be made of polyester or nylon. In some embodiments, use of a strong flexible webbing, such as polyester or nylon, may facilitate bearing high weights, such as, for example, up to at least about 200 lbs. In some embodiments, use of a strong flexible webbing, such as polyester or nylon may facilitate little to no give or stretching of the strap 70. In various embodiments, where a strong flexible webbing, such as polyester or nylon is used, a buckle, such as a triglide buckle, may be used to fasten the strap 70 to the holder 32. In some embodiments, alternative or additional flexible tension members may be used in place of the strap 70. For example, in some embodiments a rope, chain, or another flexible tension member may be used.

In various embodiments, the apparatus 10 may act as a small lightweight portable hanging device that may be used for hanging solutions in many outdoor applications. In various embodiments, the apparatus 10 may be a portable hanging device that can be brought anywhere to make generally vertical structures, such as, for example, trees or posts/poles, into temporary or semipermanent hanging surfaces.

In various embodiments, the apparatus 10 may facilitate mounting of various articles to various supports having uneven generally vertical surfaces. In some embodiments, for example, the support may be a tree and the article 12 used with the apparatus 10 may be one of many articles that one may wish to mount to the tree. In some embodiments, many varieties of article may be used with the apparatus 10. For example, an article may include any or all of a light, such as a flood light, targets, such as shooting targets, a retractable cord, a portable shelf, a garbage holder ring, a camera holder, a portable shower such as a camping shower, a gun rest, a towel rack, a fishing rod holder, a dish shelf, a portable wash basin, a bird house, one or more games such as a tether ball, a basketball hoop, a dart board, or a ladder for ladder golf (game), or one or more other articles or attachments that one may wish to mount to the tree.

In some embodiments, the first, second, and third surface engagers 34, 36, and 38 being spaced apart may facilitate stable and sturdy engagement of the holder 32 with the uneven generally vertical surface 22 of the support 20, despite the unevenness of the surface, including the curvature. For example, in some embodiments, the first, second, and third surface engagers 34, 36, and 38 may include legs having distal feet to provide three separated areas or points of contact with the surface 22 of the support 20, which may help to ensure stable abutment of the surface engagers with the surface 22 of the support 20. In some embodiments, the three separated areas or points of contact may facilitate a more stable and sturdy engagement than would be facilitated by two or fewer points of contact. In some embodiments, the three separated points of contact may facilitate a more stable and sturdy engagement than would be facilitated by four or more points of contact.

In some embodiments, the first, second, and third surface engagers 34, 36, and 38, being spaced apart may provide a more versatile and/or functional arrangement. In various embodiments, the third surface engager 38 may act as a bottom or lower surface engager that could accept downward force. In some embodiments, the third surface engager 38 may act as a load bearing arm in when the holder 32 bears weight. In various embodiments, the surface engagers 34, 36, and 38 may be spaced at a spacing that may allow for the surface engagers 34, 36, 38 to engage a generally cylindrical tree-like surface properly without the surface 22 interrupting by coming into contact with the holder 32 or the base coupling 52. In various embodiments, the surface engagers may be spaced close enough to allow the holder 32 to stay spaced apart from a support having a diameter of at least 6", but still far enough apart to allow for use with a support of a greater circumference/diameter. For example, in some embodiments, distal ends or feet of the surface engagers 34, 36, and 38 may be spaced at a distance of about 4-6 inches from one another.

Referring now to FIG. 2, there is shown the holder 32 of the apparatus 10 shown in FIG. 1, in accordance with various embodiments. In some embodiments, the holder 32 includes first and second spaced apart tension member couplers 100 and 102. In some embodiments, the first and second spaced apart tension member couplers 100 and 102 may be configured to releasably couple to the strap 70. In some embodiments, the first and second spaced apart tension member couplers 100 and 102 may facilitate releasable coupling to both ends of the strap 70, which may in some embodiments, facilitate ease of adjustability of a working length of the strap 70 and/or facilitate reduced effects on the integrity of the strap 70 which may arise in having too many holes on one end of the strap 70.

In some embodiments, the first and second spaced apart tension member couplers 100 and 102 may each include a retainer, such as, for example, a barb, a hook, post, buckle (such as, for example, a triglide buckle), or another releasable coupling configured to couple to the strap 70. In some embodiments, the first and second spaced apart tension member couplers 100 and 102 may include wide or elongated barbs or hooks, for example. In some embodiments, wide barbs or hooks may facilitate increased durability and/or improved functionality for different types of strapping applications when compared with regular barbs or hooks.

Figure 3:
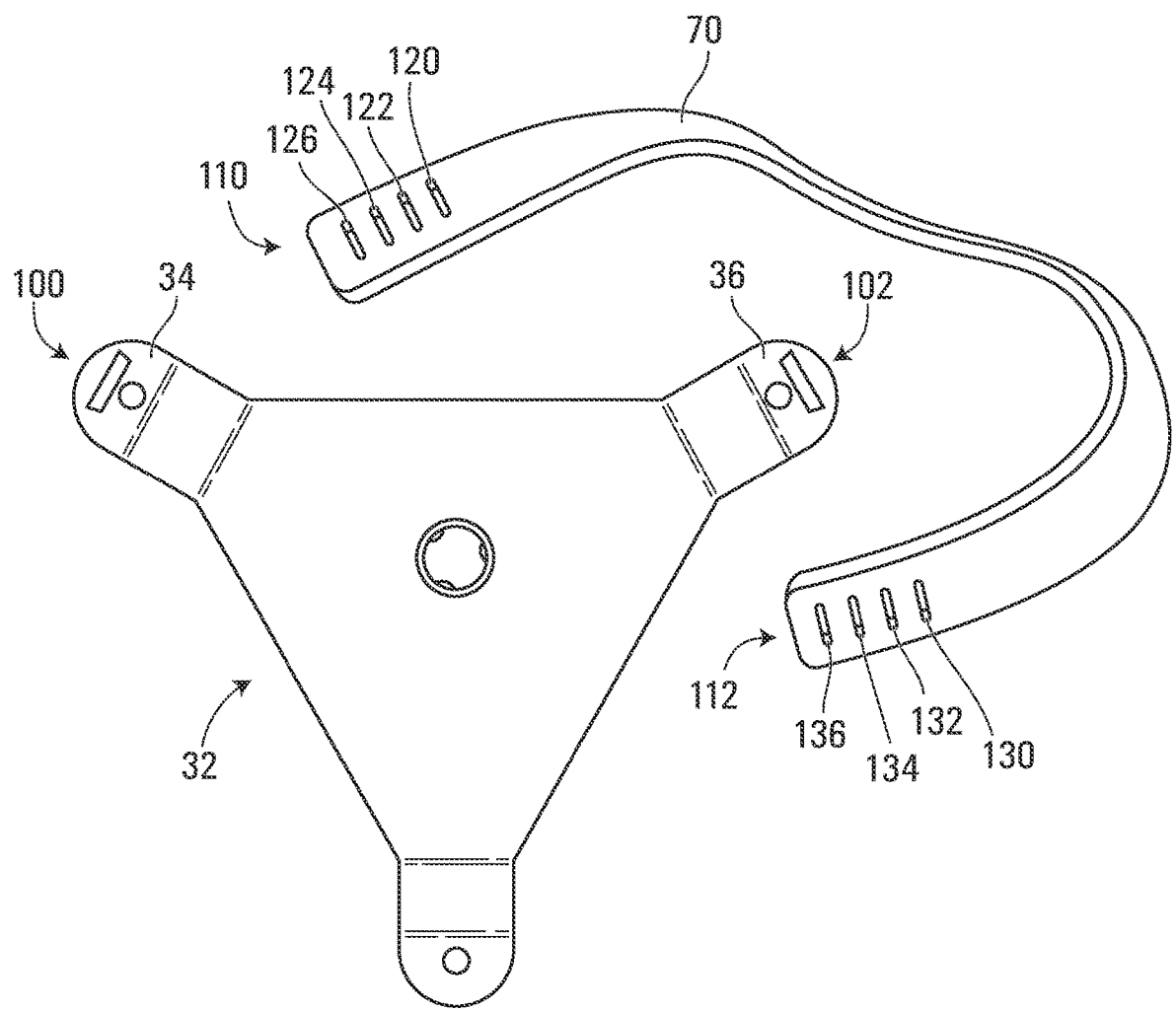
FIG. 3 is a front view of the holder and a strap of the apparatus shown in FIG. 1 according to various embodiments of the present disclosure.

Referring to FIG. 3, in various embodiments, the first and second spaced apart tension member couplers 100 and 102 may be oriented at an angle to one another, lo the angle being less than 180 degrees. In some embodiments, the angle between the first and second tension member couplers 100 and 102 may be the angle between sections of the strap 70 as they extend from the first and second spaced apart tension member couplers 100 and 102 when the strap 70 is coupled thereto. For example, the angle may be defined between imaginary lines extending along long axes of wide hooks of the couplers 100 and 102. In various embodiments, having the angle less than 180 degrees may facilitate the strap 70 extending at upward angles from the holder 32 when coupled to the first and second tension member couplers 100 and 102 and secured around the support 20. In various embodiments, the angle being less than 180 degrees may facilitate load from the strap 70 being evenly distributed across the width of the tension member couplers 100 and 102 to prevent unnecessary pressure spots on the tension member couplers 100 and 102. In some embodiments, the angle may be between about 100 degrees and about 140 degrees. For example, in some embodiments, the angle may be about 120 degrees. In various embodiments, this may facilitate use of the holder 32 with varying tree sizes and/or varying tensions in the strap 70. In various embodiments, the first and second spaced apart tension member couplers 100 and 102 may be generally similar.

Referring to FIG. 2, in various embodiments, barbs or hooks included in the first and second tension member couplers 100 and 102 may each include a barb to catch the strap 70 and prevent the strap 70 from detaching on its own. In various embodiments, the hooks may have a width and depth such that they are sturdy enough to sustain applied pressure without snapping or breaking off.

Referring to FIG. 3, there is shown the holder 32 and the strap 70 of the apparatus 10 of FIG. 1, in accordance with various embodiments. In various embodiments, the strap 70 may form at least a portion of a loop for encircling the support 20 when the strap 70 is coupled to the holder 32 as shown in FIG. 1. For example, in some embodiments, in use, a first end 110 of the strap 70 may be coupled to the first tension member coupler 100. The strap 70 may then be looped or wrapped around the support 20 as shown in FIG. 1, and a second end 112 of the strap 70 shown in FIG. 3 may be coupled to the second tension member coupler 102 as shown in FIG. 1.

Referring to FIG. 3, in various embodiments, the strap 70 may include retainer openings 120, 122, 124, and 126 at the first end 110 for coupling to the first tension member coupler 100 and retainer openings 130, 132, 134, and 136 at the second end 112 for coupling to the second tension member coupler 102. In various embodiments, the retainer openings 120-126 and 130-136 may be spaced apart to facilitate use of the strap 70 for coupling to various supports of different sizes. In various embodiments, including spaced apart retainer openings 120-126 and 130-136 at both ends of the strap 70 may facilitate ease of adjustability of a working length of the strap 70 and/or facilitate reduced effects on the integrity of the strap 70 which may arise in having too many holes on one end of the strap 70.

In some embodiments, a user may tighten the strap 70 around the support 20 before coupling the second tension member coupler 102 to a selected one of the retainer openings 130-136. In some embodiments, the user may tension the strap 70 as tightly as possible. In some embodiments, use of holes and/or barbs or hooks may facilitate quick and easy fastening and adjusting of the length and/or tension of the strap 70 around the support 20.

Figure 4:
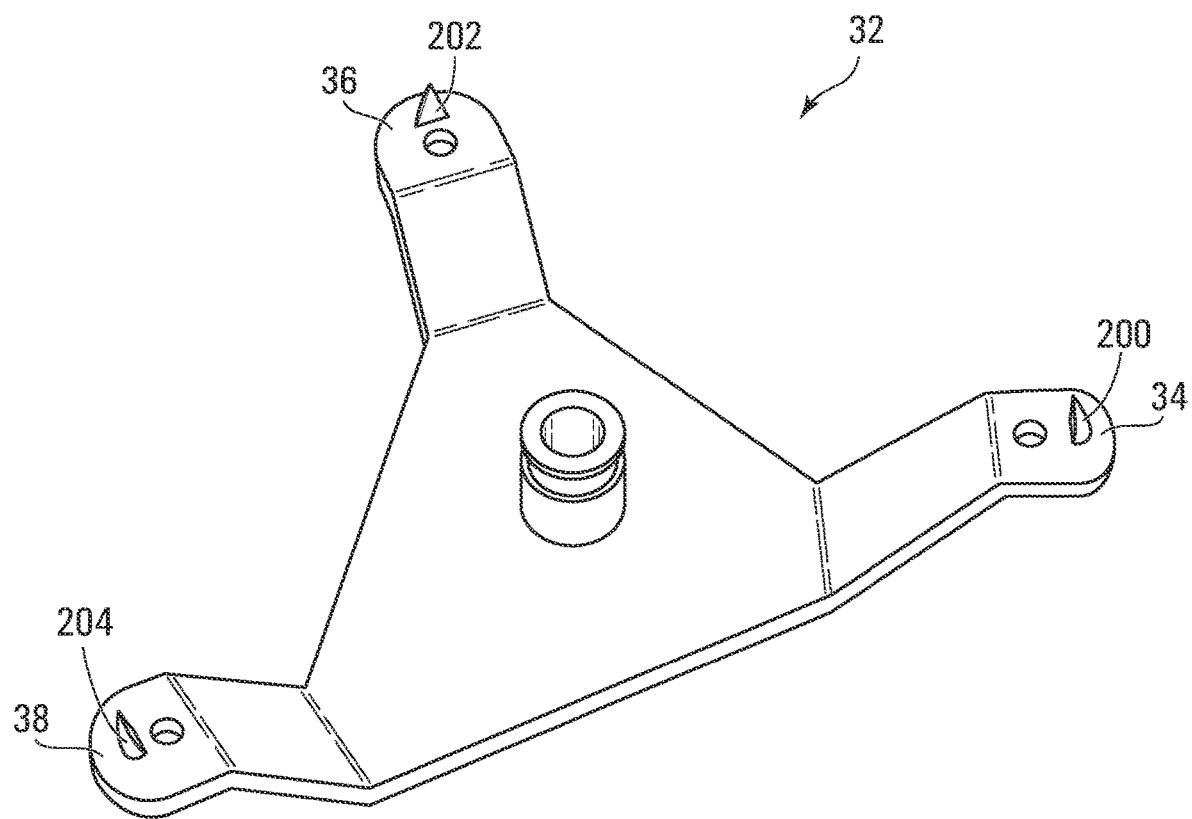
FIG. 4 is a bottom perspective view of the holder of the apparatus shown in FIG. 1 according to various embodiments of the present disclosure.

Referring now to FIG. 4, in various embodiments, the first and second surface engagers 34 and 36 may include sharp extensions in the form of first and second points 200 and 202, configured to pierce the uneven generally vertical surface 22 of the support 20 shown in FIG. 1. In some embodiments, the points 200 and 202 may act as talons, for example, for gripping the surface 22. In some embodiments, the third surface engager 38 may include a third point 204. In some embodiments, the points 200, 202, and 204 shown in FIG. 4 may help to prevent slipping of the holder 32 on the surface 22 of the support 20 shown in FIG. 1. In various embodiments, the points 200, 202, and 204 may be integral with the surface engagers 34, 36, and 38 respectively. In some embodiments, the points 200, 202, and 204 may be attached by having been molded with the surface engagers 34, 36, and 38 or welded on, for example. Points 200 and 202 may be shaped protrusions extending away from distal feet of the surface engager legs, e.g., generally orthogonally from the engaging surface of each corresponding foot.

Referring to FIG. 2, in various embodiments, the first tension member coupler 100 may be adjacent to the first surface engager 34 and the second tension member coupler 102 may be adjacent to the second surface engager 36. In some embodiments, the first and second tension member couplers 100 and 102 may be adjacent to surfaces or portions of the first and second surface engagers 34 and 36 that are configured to engage with or abut the support 20. For example, in some embodiments, the first tension member coupler 100 may include a barb or a hook that is adjacent to the point 200 shown in FIG. 4 and the second tension member coupler 102 may include a barb or a hook that is adjacent to the point 202 shown in FIG. 4. For example, in some embodiments, the first and second tension member couplers 100 and 102 may be within about 0.5 inches of the points 200 and 202 shown in FIG. 4. In various embodiments, the proximity of the first and second tension member couplers 100 and 102 to the first and second surface engagers 34 and 36 may facilitate drawing or pulling of the first and second surface engagers into abutment with the support 20 shown in FIG. 1 to provide a stable and fixed mounting arrangement.

Referring to FIG. 2, in various embodiments, each of the first and second surface engagers 34 and 36 may include a respective opening 240 and 242, which may act as a fastener receiver configured to receive and hold a fastener for fastening to the support 20. For example, in some embodiments, the openings 240 and 242 may be configured to receive a fastener such as a screw or nail, which may be affixed to the support 20 to facilitate fixing of the holder 32 to the support 20. Referring to FIG. 2, in some embodiments, the third surface engager 38 may include an opening 244, which may act as a fastener receiver configured to receive and hold a fastener for fastening to the support 20. In various embodiments, including fastener receivers, such as the openings 240, 242, and 244, may facilitate stable and/or fixed mounting of the holder 32 to the support 20.

Referring to FIG. 2, in some embodiments, the base coupling 52 of the article mount 50 may include a female coupling having an opening 280 for receiving a male coupling of the article 12. In some embodiments, the base coupling 52 being a female coupling and the article coupling 54 (shown in FIG. 1) being a male coupling may allow the article coupling to be smaller and may facilitate ease of coupling of the base coupling 52 to various types of articles. In some embodiments, a female coupling may include a lock for locking a corresponding male coupling into place. In various embodiments, the female coupling may be generally larger and/or more bulky than the male coupling. In various embodiments, the base coupling 52 being a female coupling and the article coupling 54 being a male coupling may facilitate having fewer moving parts on the article 12, which may be advantageous. In various embodiments, the base coupling 52 being a female coupling and the article coupling 54 being a male coupling may facilitate having the smaller of the two couplings on the detachable article side. In some embodiments, the base coupling 52 being a female coupling and the article coupling 54 being a male coupling may facilitate having a less expensive to manufacture coupling on the article 12, which may be advantageous because there may be multiple articles made for a single holder 32.

In some embodiments, the base coupling 52 of the article mount 50 may be positioned in a non-central position relative to the first, second, and third surface engagers 34, 36, and 38. In some embodiments, the base coupling 52 may be positioned nearer to the first and second surface engagers 34 and 36 than to the third surface engager 38. In various embodiments, such an arrangement may facilitate reduced stress or downward force on the strap 70 when in use, while also facilitating increased force from the third surface engager 38 against the support 20.

In some embodiments, the article mount 50 may include a generally planar mounting surface 306 configured to abut the article when the article is held. In various embodiments, the mounting surface 306 may include outer edges that generally follow edges of a triangle. In some embodiments, a broad surface as provided by the mounting surface 306 on the article mount 50 may facilitate multi-dimensional stability, such as, left to right and up and down stability.

Figure 5:
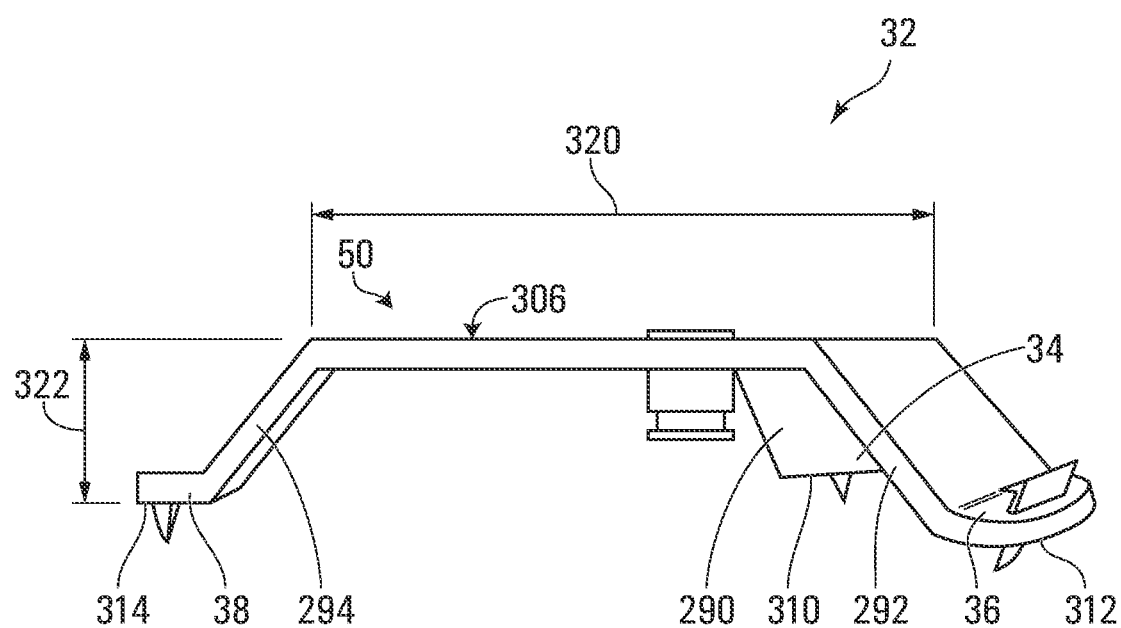
FIG. 5 is a side perspective view of the holder of the apparatus shown in FIG. 1 according to various embodiments of the present disclosure.

In various embodiments, the article mount 50 may be coupled to the first, second, and third surface engagers 34, 36, and 38 via respective legs 290, 292, and 294 that each extend at an angle to the generally planar mounting surface 306 of the article mount 50. In various embodiments, the angle may be greater than 90 degrees, such as, for example about 135 degrees. In various embodiments, an angle of greater than 90 degrees, such as, for example 135 degrees may facilitate ease of manufacturing and/or reduce material needed to provide both spacing of the article mount 50 from the support 20 shown in FIG. 1 and spacing between the first, second, and third surface engagers. Referring to FIG. 5, the holder 32 is shown from a side view according to various embodiments. In various embodiments, dimensions including a height 320 of the generally planar mounting surface 306 of the article mount 50 may be chosen to provide stability to the article 12 when the article 12 is held by the holder 32. For example, in some embodiments, the height 320 may be about 3.5 inches.

In some embodiments, feet of the first, second, and third surface engagers 34, 36, and 38 may include respective support engaging surfaces 310, 312, and 314 configured to abut the support 20 shown in FIG. 1. In some embodiments, a displacement or spacing 322 between the generally planar mounting surface 306 and the support engaging surfaces 310, 312, and 314 may facilitate adequate spacing between the article 12 and the support 20 and between the article mount 50 and the support 20 when the article 12 is coupled too the holder 32. In some embodiments, the spacing 322 may be about 1.5 inches, for example.

Referring to FIG. 2, in some embodiments, the base coupling 52 may include a female quick release coupling including locking ball bearings encircling the opening 280 and configured to selectively lock the male coupling of the article within the opening. In some embodiments, use of a quick release coupling having locking ball bearings may facilitate fast and easy coupling and decoupling between the article 12 and the holder 32. In some embodiments, use of a quick release coupling may facilitate use of a locking mechanism to hold the article 12 in place. In some embodiments, the female quick release coupling may have a spring loaded sliding coupler that disengages ball bearings allowing a male coupling to enter the female coupling. The sliding coupler may then be sprung back into place engaging the ball bearings and locking the male coupling into place.

In various embodiments, in operation, after the strap 70 has been placed around the support 20 shown in FIG. 1 and coupled to the holder 32, the article 12 may be coupled to the holder 32 via the base coupling 52 and the article coupling 54. In various embodiments, the weight of the article 12 pulling downward on the holder 32 at the base coupling 52 may cause torque to be applied to the holder 32 to push the third surface engager 38 into abutment with the surface 22 of the support 20. In various embodiments, the application of the weight or force from the article 12 at a location spaced apart from the surface 22 of the support 20 may reduce or avoid slipping of the holder 32 down the support 20.

Figure 6:
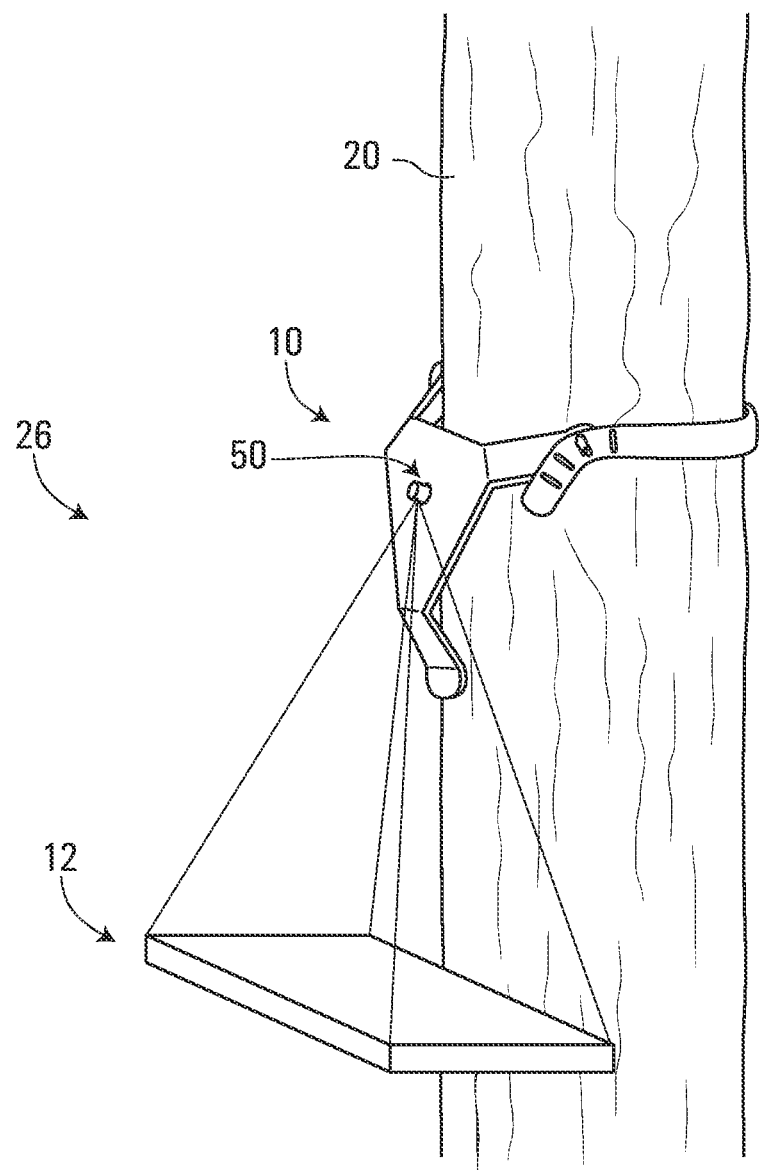
FIG. 6 is a perspective view of the system and the apparatus shown in FIG. 1 according to various embodiments of the present disclosure.

Referring to FIG. 6, there is shown the system 26 for mounting to the support 20 wherein the article 12 is held by the article mount 50 of the apparatus 10.

Figure 7:
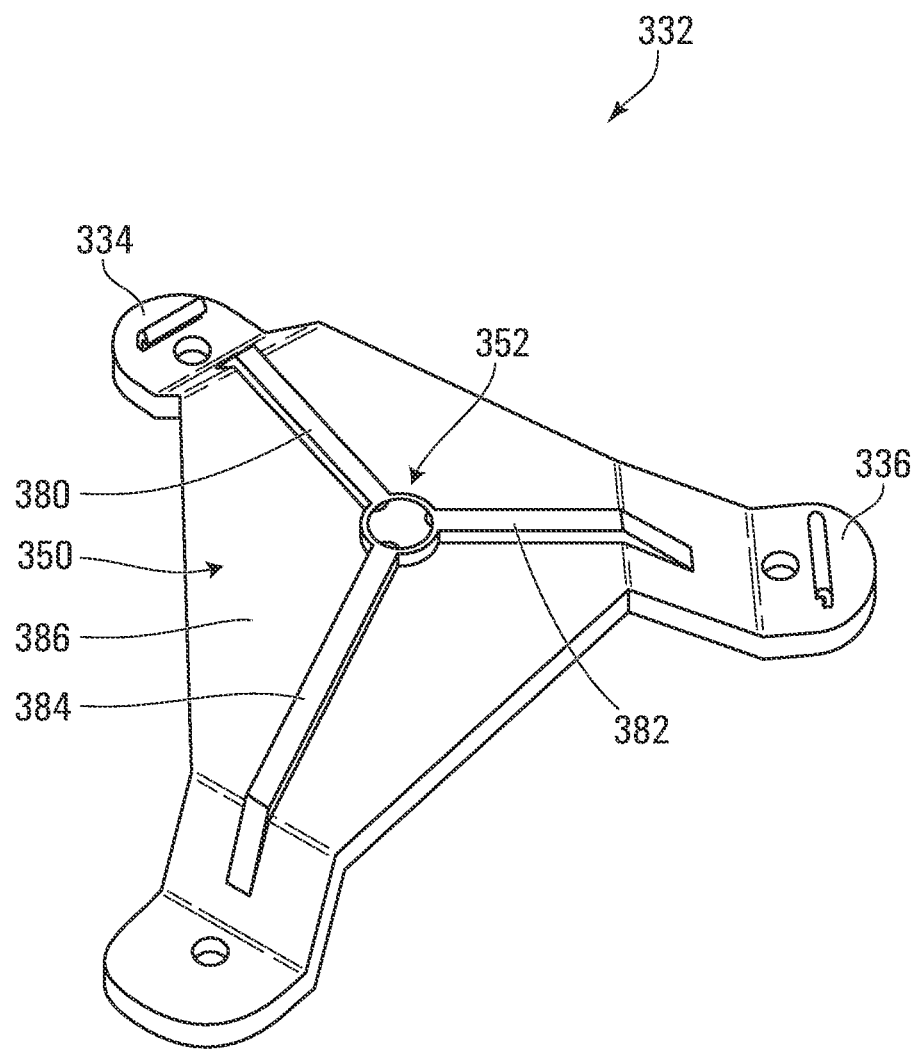
FIG. 7 is a perspective view of a holder of an apparatus for facilitating mounting of an article to a support having an uneven generally vertical surface according to various embodiments of the present disclosure.

Referring to FIG. 7, there is shown a holder 332, which may be used in place of the holder 32 in the apparatus 10 shown in FIGS. 1 to 6, in various embodiments. Referring to FIG. 7, in some embodiments the holder 332 may function generally similarly to the holder 32 shown in FIGS. 1 to 6. The holder 332 includes first, second, and third spaced apart surface engagers 334, 336, and 338 configured to abut the uneven generally vertical surface 22 of the support 20 shown in FIG. 1 and an article mount 350 coupled to the first, second, and third spaced apart surface engagers 334, 336, and 338, the article mount 350 configured to hold the article 12 shown in FIG. 1.

In some embodiments, the holder 332 may include reinforcers 380, 382, and 384 coupled between a base coupling 352 of the holder 332 and each of the first, second, and third surface engagers 334, 336, and 338. In various embodiments, the reinforcers 380, 382, and 384 may include ribs or ridges of material elevated from a surface 386 of the holder 332 and extending outward generally away from a center of the holder 332 in the general direction of the legs of the surface engagers. In various embodiments, the reinforcers 380, 382, and 384 may be integral with the surface 386. For example, in some embodiments, a portion of the holder 332 including the surface 386 and the reinforcers 380, 382, and 384 may be molded as one piece. In various embodiments, the reinforcers 380, 382, and 384 may increase rigidity of the device. In various embodiments, increased rigidity may facilitate the device achieving improved load capacity.

Figure 8:
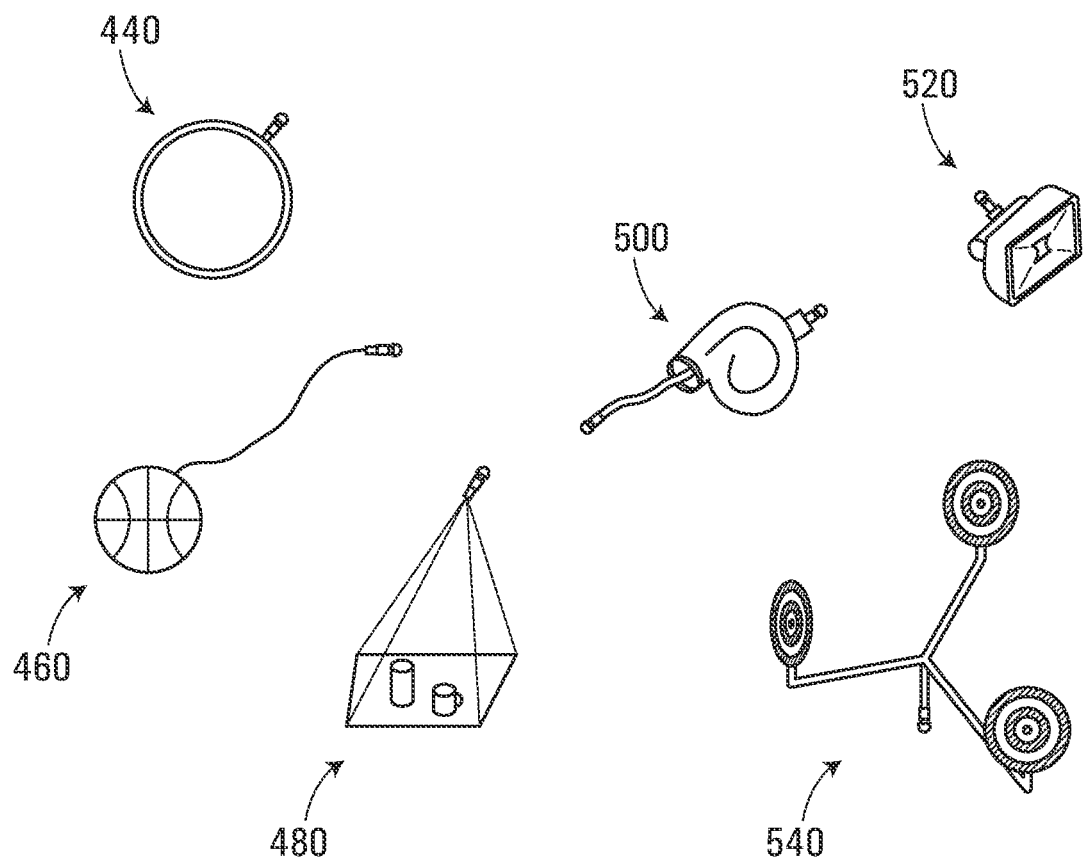
FIG. 8 is a perspective view of articles that may be included in the system shown in FIG. 1 according to various embodiments of the present disclosure.

Referring to FIG. 8, there are shown various articles that may be used in place of or in addition to the article 12 shown in FIGS. 1 and 6, in accordance with various embodiments. For example, shown in FIG. 8 is a garbage holder ring 440, a tether ball 460, a portable shelf 480, a retractable cord 500, a flood light 520, and shooting targets 540. As discussed above, in various embodiments, an article may include additional or alternative attachments or articles, such as, any or all of a light, such as a flood light, targets, such as shooting targets, a retractable cord, a portable shelf, a garbage holder ring, a camera holder, a portable shower such as a camping shower, a gun rest, a towel rack, a fishing rod holder, a dish shelf, a portable wash basin, a bird house, one or more games such as a tether ball, a basketball hoop, a dart board, or a ladder for ladder golf (game), or one or more other articles that one may wish to mount to the tree.

Figure 9:
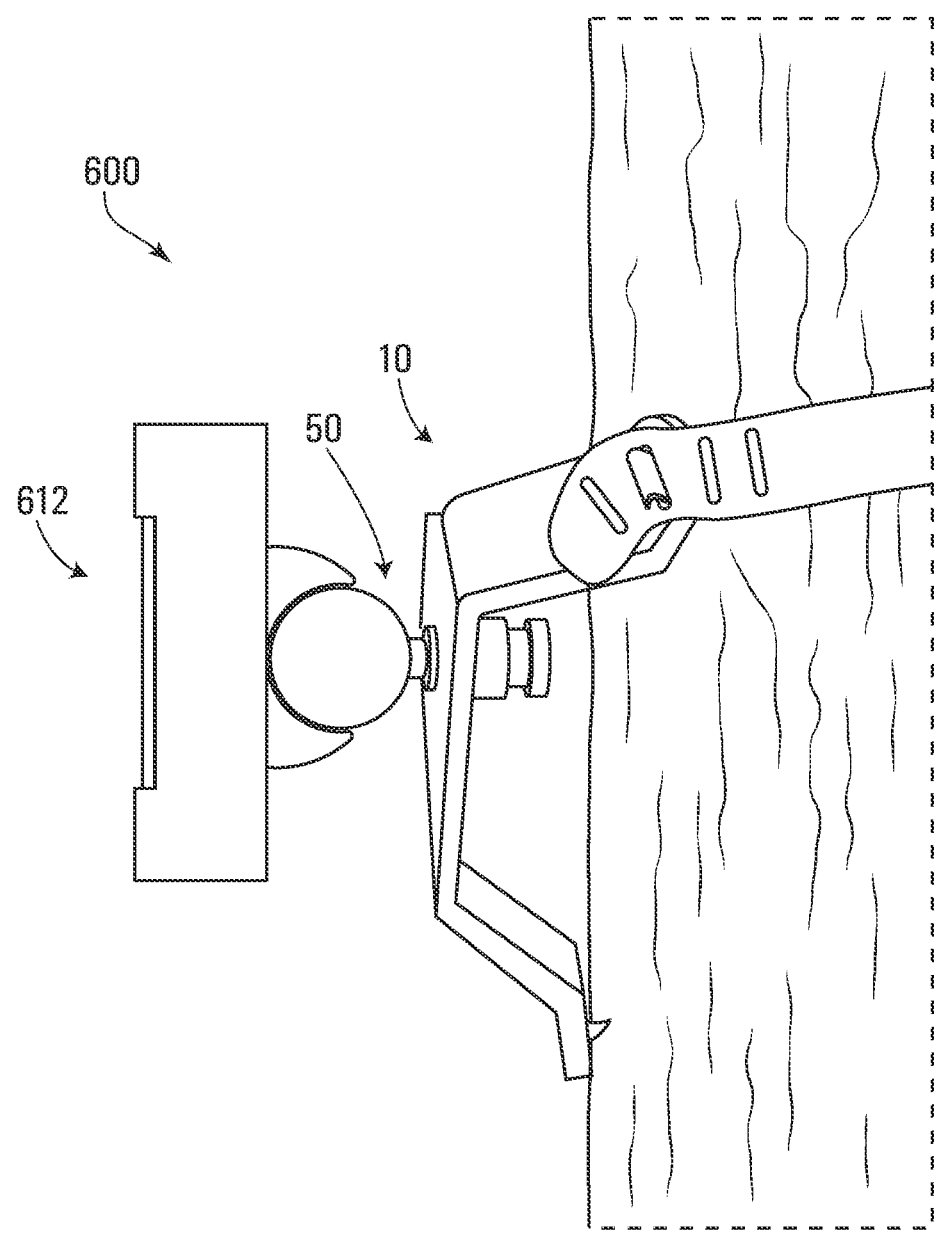
FIG. 9 is a side perspective view of a system for facilitating mounting of an article to a support having an uneven generally vertical surface according to various embodiments of the present disclosure.

Referring to FIG. 9, there is shown a system 600 generally similar to the system 26 shown in FIG. 6, including the apparatus 10 and an article 612 different from the article 12 shown in FIG. 6. In various embodiments, the article 612 may be held by the article mount 50 of the apparatus 10. Referring to FIG. 9, in various embodiments, the article 612 may include a flood light generally similar to the flood light 520 shown in FIG. 8. In various embodiments, an alternative or additional article may be used in the system 600 shown in FIG. 9 or the system 26 shown in FIG. 6, such as, for example any of the exemplary articles described above and/or shown in FIG. 8.

Figure 10:
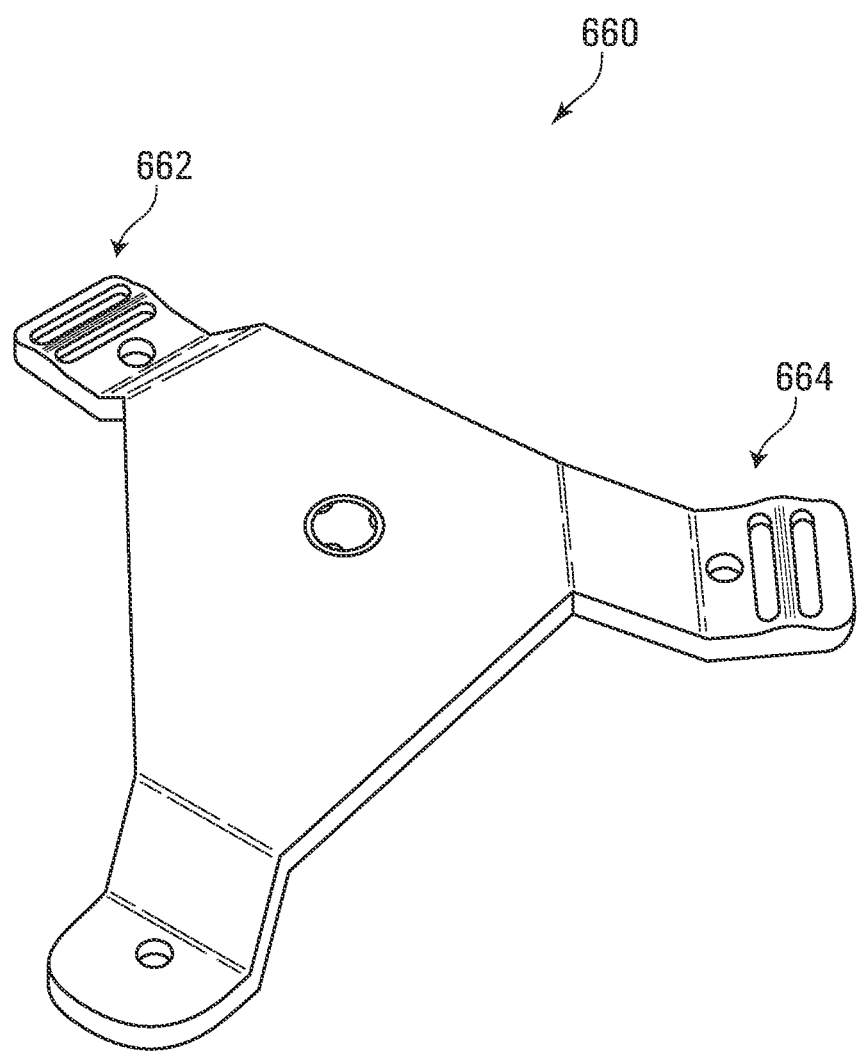
FIG. 10 is a perspective view of a holder of an apparatus for facilitating mounting of an article to a support having an uneven generally vertical surface according to various embodiments of the present disclosure.

In some embodiments, a holder 660 as shown in FIG. 10 generally similar to the holder 32 shown in FIGS. 1-6 may be used generally as discussed above having regard to the holder 32 except that the holder 660 may include first and second triglide buckles 662 and 664 acting as tension member couplers. In various embodiments, a strap which may function generally similarly to the strap 70 may be used with the holder 660 wherein the strap includes webbing, such as nylon webbing, for example, configured for fastening to the triglide buckles 662 and 664. In various embodiments, using the triglide buckles 662 and 664 may facilitate ease of adjustment and/or tightening of a strap used with the holder 660.

In various embodiments, a holder generally similar to the holder 660 shown in FIG. 10 may include a strap permanently fastened to the holder 660 on one end (e.g., near the location of the first triglide buckle 662 of the holder 660 shown in FIG. 9) and releasably attachable to a triglide buckle generally similar to the second triglide buckle 664 shown in FIG. 9. In various embodiments, such an arrangement may facilitate slower yet more sturdy and/or adjustable mounting.

In various embodiments, where an element is described as having an opening, it will be understood that the element includes physical features that define the opening.

While specific embodiments of the present disclosure have been described and illustrated, such embodiments should be considered illustrative of the present disclosure only and not as limiting the present disclosure as construed in accordance with the accompanying claims.

Additional aspects and features of apparatuses for facilitating mounting of an article to a support are presented below, without limitation, as a series of paragraphs alphanumerically designated for clarity and efficiency.

A0. An apparatus for facilitating mounting of an article to a support having an uneven generally vertical surface, the apparatus comprising:
    a holder including:
        first, second, and third spaced apart surface engagers configured to abut the uneven generally vertical surface of the support; and an article mount coupled to the first, second, and third spaced apart surface engagers, the article mount configured to hold the article; and at least one flexible tension member configured to couple the holder to the support to draw at least one of the first, second, and third surface engagers into abutment with the uneven generally vertical surface of the support.

A1. The apparatus of A0, wherein at least one of the first, second, and third surface engagers includes a point configured to pierce the uneven generally vertical surface of the support.

A2. The apparatus of A0 or A1, wherein the article mount includes a base coupling configured to couple to an article coupling of the article.

A3. The apparatus of A2, wherein the base coupling includes a female coupling having an opening for receiving a male coupling of the article.

A4. The apparatus of A3, wherein the female coupling includes a female quick release coupling including locking ball bearings encircling the opening of the female coupling and configured to selectively lock the male coupling of the article within the opening.

A5. The apparatus of any one of paragraphs A0 through A4, wherein the holder includes first and second spaced apart tension member couplers configured to releasably couple to the at least one flexible tension member.

A6. The apparatus of A5, wherein the first tension member coupler is adjacent to the first surface engager and the second tension member coupler is adjacent to the second surface engager.

A7. The apparatus of paragraph A5 or A6, wherein the first and second tension member couplers are oriented at an angle to one another, the angle being less than 180 degrees.

A8. The apparatus of A7, wherein the angle is between about 100 degrees and about 140 degrees.

A9. The apparatus of any one of paragraphs A5 through A8, wherein each of the first and second tension member couplers includes a barb.

A10. The apparatus of any one of paragraphs A5 through A9, wherein the at least one flexible tension member includes a first plurality of spaced apart retainer openings at a first end of the at least one flexible tension member and a second plurality of spaced apart retainer openings at a second end of the at least one flexible tension member, the second end opposite of the first end, wherein the first and second pluralities of retainer openings are configured to couple to the first and second spaced apart tension member couplers respectively.

A11. The apparatus of any one of paragraphs A0 through A10, wherein the at least one flexible tension member is configured to form at least a portion of a loop for encircling the support when the at least one flexible tension member is coupled to the holder.

A12. The apparatus of any one of paragraphs A0 through A11, wherein each of the first and second surface engagers includes a respective fastener receiver configured to receive and hold a fastener for fastening to the support.

A13. The apparatus of any one of paragraphs A0 through A12, wherein the article mount includes a generally planar mounting surface configured to abut the article when the article is held and the first, second, and third spaced apart surface engagers each include a respective leg extending at an angle to the mounting surface, the angle being greater than 90 degrees.

A14. The apparatus of A13, wherein the angle is about 135 degrees.

A15. A system for mounting to a support having an uneven generally vertical surface, the system comprising: the apparatus of any one of paragraphs A0 through A14; and an article configured to be held by the article mount of the apparatus.

A16. The system of A15, wherein the article is held by the article mount of the apparatus.

A17. The system of A15 or A16, wherein the article includes a garbage holder ring, a tether ball, a portable shelf, a retractable cord, a flood light, or one or more shooting targets.

The invention claimed is:

1. An apparatus for facilitating mounting of an article to a support having an uneven generally vertical surface, the apparatus comprising:
   a holder including:
   first, second, and third spaced apart surface engagers configured to abut the uneven generally vertical surface of the support; and
   an article mount coupled to the first, second, and third spaced apart surface engagers, the article mount configured to hold the article, wherein the article mount includes a generally planar mounting surface configured to abut the article when the article is held and the first, second, and third spaced apart surface engagers are each coupled to the article mount by a respective leg extending at an angle to the mounting surface, the angle being greater than 90 degrees; and
   at least one flexible tension member configured to couple the holder to the support to draw at least one of the first, second, and third surface engagers into abutment with the uneven generally vertical surface of the support.

2. The apparatus of claim 1 wherein at least one of the first, second, and third surface engagers includes a point configured to pierce the uneven generally vertical surface of the support.

3. The apparatus of claim 1 wherein the article mount includes a base coupling configured to couple to an article coupling of the article.

4. The apparatus of claim 3 wherein the base coupling includes a female coupling having an opening for receiving a male coupling of the article.

5. The apparatus of claim 4 wherein the female coupling includes a female quick release coupling including locking ball bearings encircling the opening of the female coupling and configured to selectively lock the male coupling of the article within the opening.

6. The apparatus of claim 1 wherein the holder includes first and second spaced apart tension member couplers configured to releasably couple to the at least one flexible tension member.

7. The apparatus of claim 6 wherein the first tension member coupler is adjacent to the first surface engager and the second tension member coupler is adjacent to the second surface engager.

8. The apparatus of claim 6 wherein the first and second tension member couplers are oriented at an angle to one another, the angle being less than 180 degrees.

9. The apparatus of claim 8 wherein the angle is between about 100 degrees and about 140 degrees.

10. The apparatus of claim 6 wherein each of the first and second tension member couplers includes a barb.

11. The apparatus of claim 6 wherein the at least one flexible tension member includes a first plurality of spaced apart retainer openings at a first end of the at least one flexible tension member and a second plurality of spaced apart retainer openings at a second end of the at least one flexible tension member, the second end opposite of the first end, wherein the first and second pluralities of retainer openings are configured to couple to the first and second spaced apart tension member couplers respectively.

12. The apparatus of claim 1 wherein the at least one flexible tension member is configured to form at least a portion of a loop for encircling the support when the at least one flexible tension member is coupled to the holder.

13. The apparatus of claim 1 wherein each of the first and second surface engagers includes a respective fastener receiver configured to receive and hold a fastener for fastening to the support.

14. The apparatus of claim 1 wherein the angle is about 135 degrees.

15. A system for mounting to a support having an uneven generally vertical surface, the system comprising:
the apparatus of claim 1; and
an article configured to be held by the article mount of the apparatus.

16. The system of claim 15 wherein the article is held by the article mount of the apparatus.

17. The system of claim 15 wherein the article includes a garbage holder ring, a tether ball, a portable shelf, a retractable cord, a flood light, or one or more shooting targets.

18. An apparatus for facilitating mounting of an article to a support having an uneven generally vertical surface, the apparatus comprising:
a holder including:
first, second, and third spaced apart surface engagers configured to abut the uneven generally vertical surface of the support; and
an article mount coupled to the first, second, and third spaced apart surface engagers, the article mount configured to hold the article, wherein the article mount includes a generally planar mounting surface configured to abut the article when the article is held and the first, second, and third spaced apart surface engagers each extend from an end of a respective leg extending from an edge of the mounting surface at an angle to the mounting surface, the angle being greater than 90 degrees; and
at least one flexible tension member configured to couple the holder to the support to draw at least one of the first, second, and third surface engagers into abutment with the uneven generally vertical surface of the support.

19. An apparatus for facilitating mounting of an article to a support having an uneven generally vertical surface, the apparatus comprising:
a holder including:
first, second, and third spaced apart surface engagers configured to abut the uneven generally vertical surface of the support; and
an article mount coupled to the first, second, and third spaced apart surface engagers, the article mount configured to hold the article, wherein the article mount includes a generally planar mounting surface and the first, second, and third spaced apart surface engagers each extend from an end of a respective leg extending from the mounting surface at an angle to the mounting surface, the angle being greater than 90 degrees; and
at least one flexible tension member configured to couple the holder to the support to draw at least one of the first, second, and third surface engagers into abutment with the uneven generally vertical surface of the support.

* * * * *